SEQUENTIAL TRIGGER GENERATOR
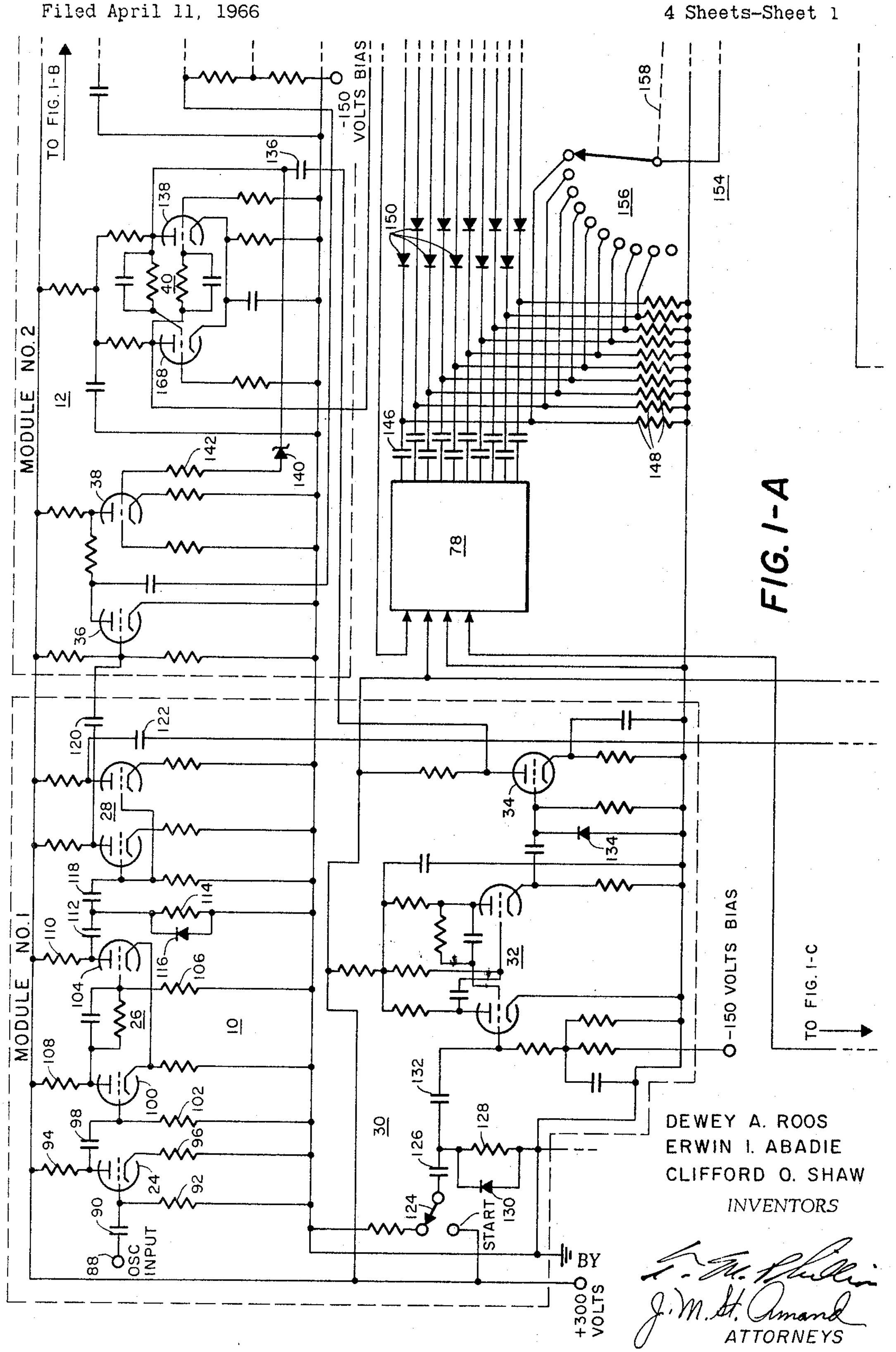
FIG. 1-A
DEWEY A. ROOS
ERWIN I. ABADIE
CLIFFORD O. SHAW
*INVENTORS*
*ATTORNEYS*

May 14, 1968 D. A. ROOS ET AL 3,383,606
SEQUENTIAL TRIGGER GENERATOR
Filed April 11, 1966 4 Sheets-Sheet 2
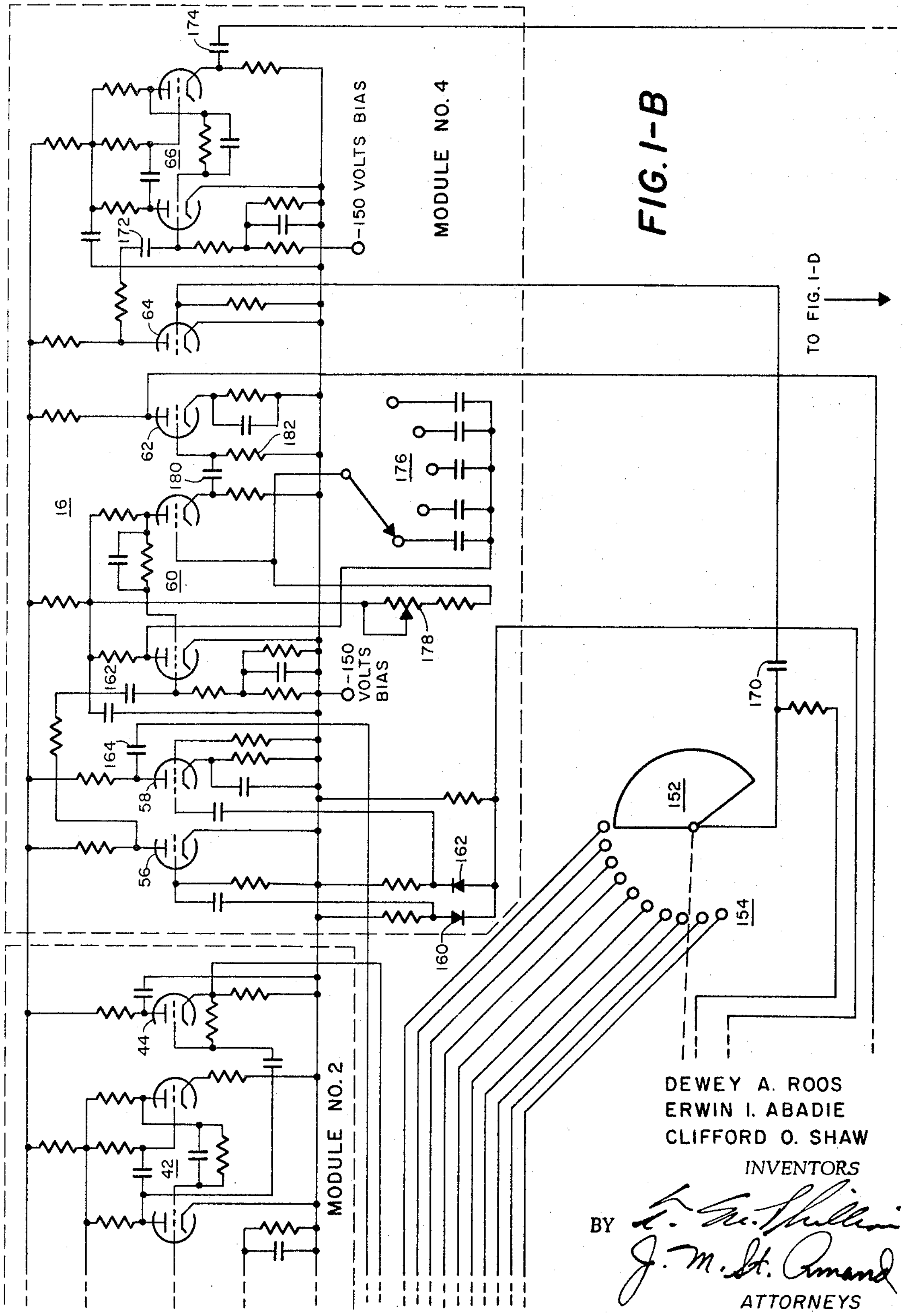
FIG. I-B
DEWEY A. ROOS
ERWIN I. ABADIE
CLIFFORD O. SHAW
INVENTORS
BY [signature]
[signature]
ATTORNEYS SEQUENTIAL TRIGGER GENERATOR
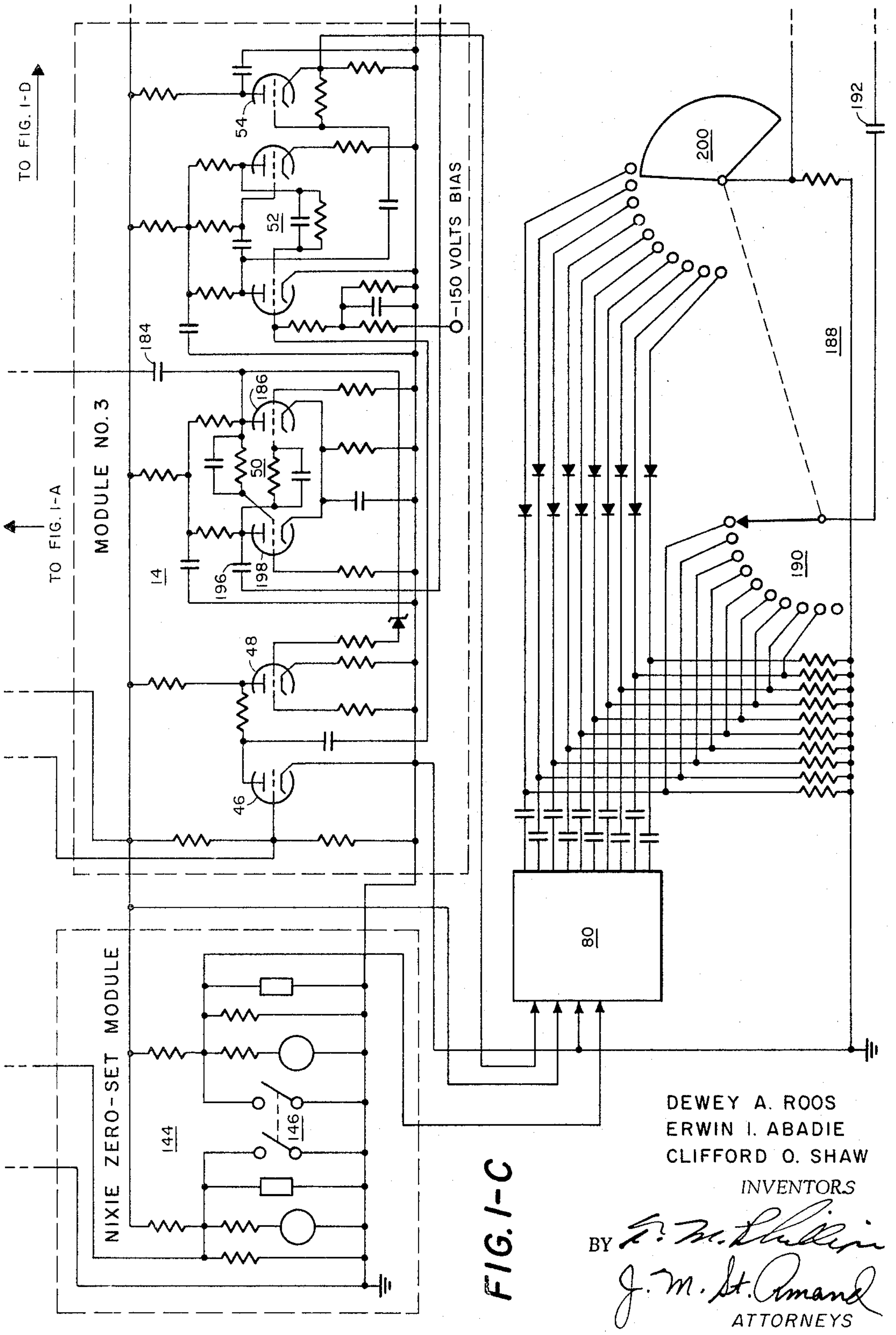
FIG. I-C
DEWEY A. ROOS
ERWIN I. ABADIE
CLIFFORD O. SHAW
INVENTORS
BY [signature]
[signature]
ATTORNEYS

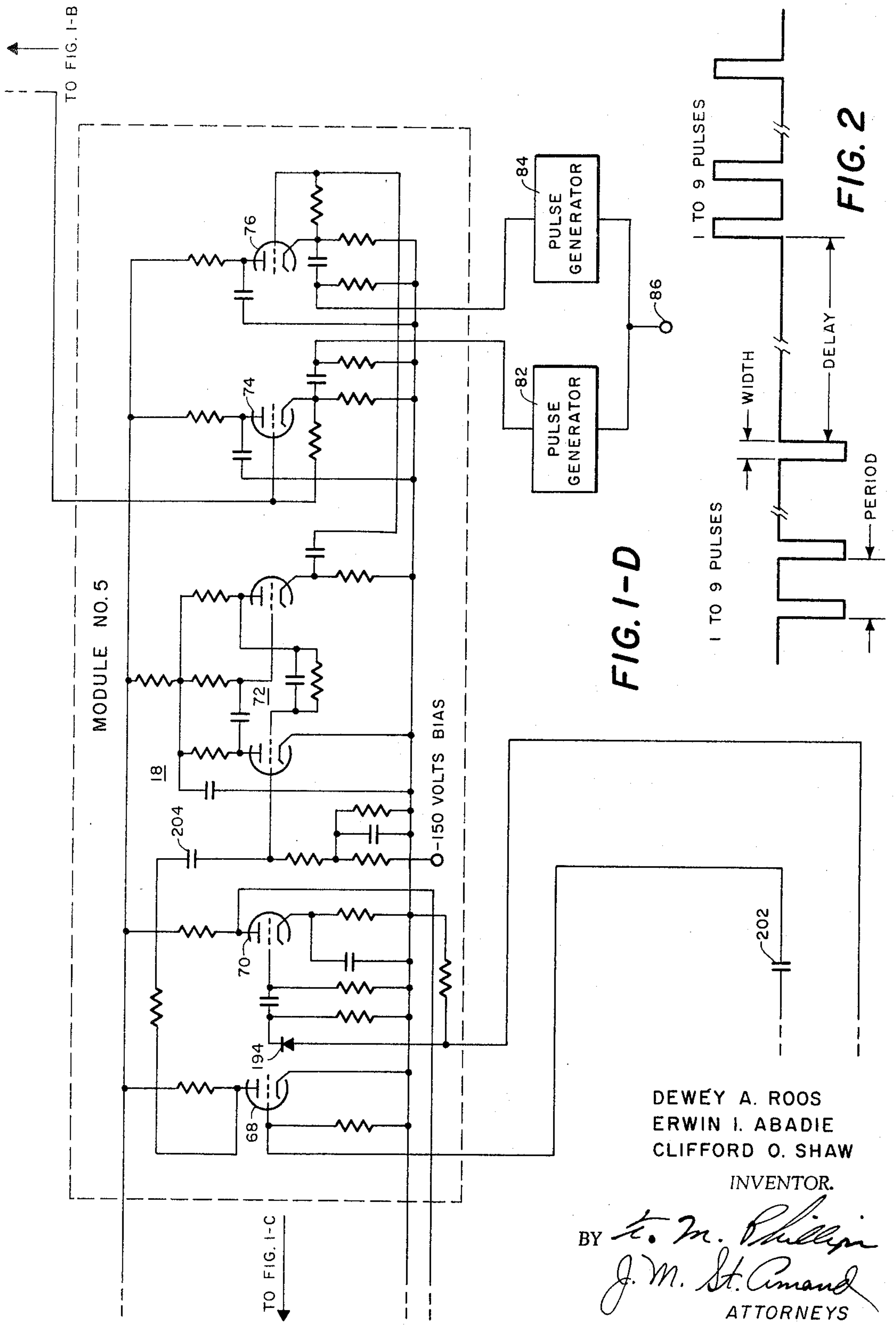
FIG. I-D, FIG. 2
DEWEY A. ROOS
ERWIN I. ABADIE
CLIFFORD O. SHAW
INVENTOR.
BY L. M. Phillips
J. M. St. Amand
ATTORNEYS United States Patent Office 3,383,606

Patented May 14, 1968

3,383,606

SEQUENTIAL TRIGGER GENERATOR

Dewey A. Roos, Corona, Erwin I. Abadie, Riverside, and Clifford O. Shaw, Orange, Calif., assignors to the United States of America as represented by the Secretary of the Navy Filed Apr. 11, 1966, Ser. No. 541,864
9 Claims. (Cl. 328—187)

The invention herein described may be manufactured and used by or for the Government of the United States of America for governmental purposes without the payment of any royalties thereon or therefor.

The present invention relates to a sequential trigger generator and more particularly to a sequential trigger generator which will provide a selectable sequence of pulses from two channels, separated by a variable delay.

For checking out certain electronic equipment it is desirable to have available a source of selectable sequence of pulses from two channels, separated by a variable delay. There is no known device which will satisfy the above requirements. Accordingly, an object of the present invention is the provision of such a device.

Other objects and many of the attendant advantages of this invention will become readily appreciated as the same becomes better understood by reference to the following detailed description when considered in connection with the accompanying drawings wherein:

FIGS. 1–A through 1–D are a schematic diagram of a preferred embodiment of the invention.

FIG. 2 is a diagram showing the waveform of a pulse train generated by the invention.

The sequential trigger generator incorporates five electronic modules and two decade counter modules in two channels, A and B.

Module 10 is common to both channels and it consists of audio amplifier 24, a Schmitt trigger 26, a single input-dual output pulse amplifier 28 and a manual start trigger circuit 30. Manual start trigger circuit 30 consists of monostable multivibrator 32 and pulse amplifier 34.

Module 12 (FIG. 1–A) consists of a gated amplifier 36, control tube 38, bistable multivibrator 40, monostable multivibrator 42 and cathode follower 44. Module 14 (FIG. 1–C) consists of a gated amplifier 46, control tube 48, bistable multivibrator 50, monostable multivibrator 52 and cathode follower 54. Module 16 consists of pulse amplifiers 56, 58, monostable multivibrator 60, pulse amplifiers 62, 64 and monostable multivibrator 66. Module 18 consists of pulse amplifiers 68, 70, monostable multivibrator 72 and cathode followers 74, 76. Decade counter modules 78 and 80 are identical and may be of the Nixie tube type Burrough's model No. DC–102. The output pulses from channel A are fed to pulse generator 82 and the output of pulse of channel B are fed to pulse generator 84. The two outputs from pulse generators 82 and 84 are combined to produce a pulse train at output terminal 86 as shown in FIG. 2.

An input signal at terminal 88 of the desired frequency from an audio oscillator (not shown) is coupled through capacitor 90 to the control grid of amplifier 24 across grid resistor 92. The plate of tube 24 is connected to a B+ voltage supply of, for example, +300 volts through load resistor 94. The cathode of tube 24 is connected to ground through cathode resistor 96. The output of amplifier 24 is coupled through coupling capacitor 98 to the control grid of the tube 100 (the input stage of Schmitt trigger 26) across grid resistor 102. The output of tube 100 is coupled to the grid of tube 104 (the output stage of Schmitt trigger 26) across grid resistor 106. B+ voltage is supplied to the plates of tubes 100 and 104 through load resistors 108 and 110 respectively. The output of Schmitt trigger 26 is differentiated by capacitor 112 and resistor 114. The negative spike of the differentiated signal is grounded through diode 116 and the positive spike is coupled through coupling capacitor 118 to both grids of the dual output pulse amplifier 28. The two outputs which are negative pulses are coupled through coupling capacitors 120 and 122 to gated amplifiers 36 and 46 in modules 12 and 14 respectively.

When switch 124 which may be of the push button type is temporarily moved to the start position, capacitor 126 is charged to B+ voltage through a parallel circuit consisting of resistor 128 and diode 130. A narrow positive pulse is produced which is coupled through capacitor 132 to the input grid of monostable multivibrator 32. This triggers multivibrator 32 and produces a negative pulse of approximately 30 volts with a width of 175 microseconds. This pulse is differentiated and the negative spike is coupled to ground through diode 134 and the positive spike is directly coupled to pulse amplifier 34. The negative pulse output of pulse amplifier 34 is coupled through coupling capacitor 136 to the output anode of gate circuit 40 which is a bistable multivibrator. The grid of tube 138 is sufficiently biased so that the first half of multivibrator 40 is normally conducting and the other half is cutoff. The plate voltage of tube 138 is relatively high approximately 260 volts, which is coupled through Zener diode 140 and dropping resistor 142 to the grid of control tube 38, causing control tube 38 to reach saturation. The plate voltage of control tube 38 is also the plate supply voltage of gated amplifier 36. The plate voltage of tubes 36 and 38 is low when control tube 38 is conducting heavily and with the positive bias on the grid of gated amplifier 36, gated amplifier 36 is prevented from amplifying the negative pulses appearing on the grid.

Bistable multivibrator 40 flips to the other state when it receives the negative pulses on the plate of tube 138 from the manual start trigger circuit 30. Tube 138 of bistable multivibrator 40 is now conducting; the plate voltage is now less than the trigger voltage required by Zener diode 140, and the positive bias is removed from the control grid of control tube 38 which causes the conduction of control tube 38 to decrease, increasing its plate supply voltage which is also the plate supply voltage of gated amplifier tube 36, allowing it to amplify. The positive pulses at the output of gated amplifier 36 are coupled to and trigger monostable multivibrator 42 of which the negative output is coupled to the control grid of cathode follower 44. The output of cathode follower 44 is coupled to the signal input terminal block of decade counter module 78.

Decade counter module 78 consists of a bistable multivibrator, a beam switching tube with associated circuits and a Nixie readout tube.

The Nixie tubes are all electronic, gas-filled, cold-cathode indicators. They consist of a common anode and ten individual metallic cathodes, each of which is formed to the shape of numerals, 0–9. Application of a negative voltage to the selected numeral with respect to the common anode makes the numeral the cathode of a simple gas discharge diode. Only the selected numeral is visible in the common viewing area because the visual glow discharge is considerably larger than its metallic source. A zero set circuit 144 (FIG. 1–C) is provided to manually resst the Nixie tubes to 0 at the completion of a cycle of operation. This is done by closing switch 146 momentarily to remove the bias from modules 78 and 80.

The beam switching tube of Nixie module 78 is a high-speed, ten-position, electron-switching device. Within the beam switching tube are ten arrays of independent elements positioned around a centrally located cathode. An electron beam can be formed from the cathod to any one position and then can be switched sequentially or at random by use of the elements in each array to any of the other nine positions of the tube. The beam switching tube will advance to the next position each time a pulse of the proper shape and amplitude is received at its input. A negative pulse is available at the output of the beam switching tube position which is common to the number of the pulses being counted.

Decade counter 78 counts the pulses which are being received from cathode follower 44 of module 12 and the individual outputs from the ten positions of the beam switching tube are differentiated by the differentiating networks composed of capacitors 146 and resistors 148. Two outputs are taken from each differentiated network, the negative spike is coupled through a diode 150 to its corresponding position on a progressively shorting wafer section 152 (FIG. 1–B) of pulse selector switch 154. Both the negative and the positive spikes are coupled directly directly to corresponding portions on the single pole wafer section 156 of the pulse selector switch 154. The two wafer sections 152 and 156 of pulse selector switch 154 are on a common shaft 158. The pulses from the common terminal of the single pole, multi-position wafer section 156 of pulse selector switch 154 are coupled through steering diodes 160 and 162 to the inputs of separate pulse amplifiers 56 and 58 respectively in module 16. The output of negative pulse amplifier 56 is coupled through capacitor 162 to and triggers variable delay monostable multivibrator 60. The output of positive pulse amplifier 58 is coupled through capacitor 164 to the plate of tube 168 of bistable multivibrator 40 in module 12 which flips it back to its normal state. This cuts off amplifier 36 in module 12 which causes decade counter 78 to stop counting. With pulse selector switch 154 in the tenth position, continuous pulses are provided at the output of channel A.

The output pulses from the common terminal of the progressively shorting wafer section 152 of pulse selector switch 154 is coupled through capacitor 170 to pulse amplifier 64 in module 16, the output of which is coupled through capacitor 172 to trigger monostable multivibrator 66 in module 16. The output of monostable multivibrator 66 is coupled through capacitor 174 through cathode follower 74 in module 18 to pulse generator 82, the output of channel A. The variable delay of monostable multivibrator 60 of module 16 is provided by variable delay circuit 176 and the values of the capacitors should be chosen to provide a range from 200 microseconds to 24 milliseconds of delay. As shown, the delay is accomplished in five steps while vernier control is provided by variable resistor network 178. Monostable multivibrator 60 determines the delay between the last pulse of channel A and the first pulse of channel B. The minimum delay between the two channels is limited to the pulse spacing of input frequency at terminal 88.

The output of the variable delay monostable multivibrator 60 is differentiated by capacitor 180 and resistor 182, and the positive spike which is produced by the trailing edge of the output pulse is amplified by amplifier 62. The output of amplifier 62 is coupled through capacitor 184 to the plate of tube 186 of bistable multivibrator 50 of module 14. The operation of module 14 is the same as that of module 12 and decade counter 80 is driven by the output of module 14 and its operation is the same as that of decade counter 78.

Pulse selector switch 188 is coupled to the output of decade counter 80 and selects the number of pulses desired from channel B in the same manner as switch 154 of channel A. The tenth position of pulse selector switch 188 will provide continuous pulses for the output of channel B in the same manner as the tenth position of switch 154 provides continuous pulses at the output of channel A.

The output pulses appearing at the common terminal of single pole multi-position wafer section 190 of pulse selector switch 188 are coupled through capacitor 192 through diode 194 to the input of pulse amplifier 70. Only the positive pulses are permitted to pass diode 194, therefore only the positive pulses are amplified. The output of amplifier 70, negative pulse, is coupled through capacitor 196 to the plate of tube 198 of bistable multivibrator 50 in module 14 which causes it to flip back to its normal state. When bistable multivibrator 50 returns to its normal state, gated amplifier 46 is cut off which causes decade counter 80 to stop counting. The selected number of pulses are coupled from the common terminal of progressively shorting wafer section 200 through capacitor 202 to the input grid of pulse amplifier 68. The output of pulse amplifier 68 is coupled through capacitor 204 to trigger monostable multivibrator 72. The output of monostable multivibrator 72 is coupled through cathode follower 76 to pulse generator 84.

In operation the desired pulse repetition frequency is selected by adjustment of the audio oscillator (not shown) and its continuous sinusoidal signal is fed into terminal 88 of amplifier 24. The output of amplifier 24 is fed into Schmitt trigger 26 which drives two pulse amplifiers 28. The outputs of the pulse amplifiers 28 are coupled to gated amplifiers 36 and 46, respectively, which for the moment are closed. The signal path is terminated at this point pending further action.

Depression of the start switch 124 (FIG. 1–A) initiates a single cycle or train of events as follows: The output of start switch 124 triggers monostable multivibrator 32, whose output is differentiated and amplified by pulse amplifier 34. Pulse amplifier 34 triggers bistable multivibrator 40, initiating a gate pulse. The gate pulse opens gated amplifier 36. This permits processed pulses from input terminal 88 to be applied to monostable multivibrator 42. This circuit serves to shape the pulses which are then fed, via cathode follower 44, to counter 78. The output of counter 78 may be either 2 to 10 pulses ($n$) or continuous, as determined by pulse selector 154. The outputs of counter 78 are differentiated and coupled into pulse selector 154. In the noncontinous position, the $n-1$ pulse output of pulse selector 154 is coupled to pulse amplifiers 56 and 58. Amplifier 58 output triggers bistable multivibrator 40, terminating the gate pulse and closing gated amplifier 36 via control tube 38. The closing of gated amplifier 36 terminates the pulse group in this channel. The selected $n-1$ pulses from pulse selector 154 are amplified by amplifier 64, shaped by monostable multivibrator 66, isolated by cathode follower 74, and coupled to pulse generator 82.

The differentiated $n-1$ pulse output of pulse selector 154, which was amplified by amplifier 56, is delayed by monostable multivibrator 60 and amplified by pulse amplifier 62. This signal is used to initiate the fire signal pulse train $t$ seconds after termination of the gate channel pulse train. The pulse triggers bistable multivibrator 50, initiating a gate pulse that opens gated amplifier 46 via control tube 48. This results in the passage of processed input pulses from terminal 88 to monostable multivibrator 52, whose output is fed through cathode follower 54 to counter 80. The output of counter 80 may be either 2 to 10 pulses ($n$) or continuous, as determined by pulse selector 188. The outputs of counter 80 are differentiated and coupled into pulse selector 188. In the noncontinuous position, the $n-1$ pulse output of pulse selector 188 is coupled to pulse amplifier 70. Amplifier 70 output triggers bistable multivibrator 50, terminating the gate pulse and thereby closing gated amplifier 46 via control tube 48. The closing of gated amplifier 48 terminates the pulse group in this channel. The selected $n-1$ pulses from pulse selector 188 are amplified by amplifier 68, shaped by monostable multivibrator 72, isolated by cathode follower 76, and coupled to pulse generator 84.

When pulse selectors 154 or 188 are in the continuous position, the gated amplifiers 36 or 46 are held open, allowing continuous pulses, at the selected PRF, to pass through channel A out or channel B out, or both simultaneously, as required.

Obviously many modifications and variations of the present invention are possible in the light of the above teachings. It is therefore to be understood that within the scope of the appended claims the invention may be practiced otherwise than as specifically described.

What is claimed is:

1. In a sequential trigger generator for generating a selectable sequence of pulses of variable delay, the combination comprising:

(a) a first pulse generating circuit for generating output pulses of a predetermined frequency, (b) first circuit means coupled to said first pulse generator circuit for allowing a first preselected number of pulses to pass, (c) variable delay circuit means, (d) second circuit means coupling the last pulse passed by said first circuit means to said first pulse generator for blocking pulses being fed to said first circuit means and to said variable delay circuit means for initiating a pulse after a predetermined time delay, (e) a second pulse generator circuit coupled to said variable delay means for generating output pulses of said predetermined frequency, (f) third circuit means coupled to said second pulse generator circuit for allowing a second preselected number of pulses to pass when pulses are allowed to be fed to said third circuit means in response to a delayed pulse being received at said second pulse generator circuit from said variable delay means, (g) fourth circuit means coupling the last pulse passed by said third circuit means to said second pulse generator circuit for blocking pulses being fed to said third circuit means, (h) pulse utilizing means coupled to said first and third circuit means for utilizing said passed pulses.

2. The sequential trigger generator of claim 1 wherein said first pulse generator comprises:

(a) a Schmitt trigger circuit for generating output pulses in response to input triggering pulses of a predetermined frequency, (b) pulse amplifier means coupled to said Schmitt trigger circuit for amplifying said output pulses, (c) a first gate circuit coupled to said pulse amplifier for passing said amplified pulses when said gate circuit is biased open, (d) a monostable multivibrator circuit coupled to said gate circuit and being responsive to pulse signals passed by said first gate circuit to generate a series of output pulses.

3. The sequential trigger generator of claim 2 wherein said first circuit means includes:

(a) a first decade counter having an input coupled to the output of said first monostable multivibrator circuit and having a plurality of outputs, (b) a first selector switch having a progressively shorting wafer section which has a plurality of inputs corresponding to the plurality of outputs of said first decade counter and a single pole multi-position wafer section which has a plurality of inputs corresponding to the plurality of outputs of said first decade counter, (c) a differentiating network coupled to said plurality of outputs for differentiating the output pulses from said first decade counter, (d) said differentiated pulses being connected directly to the plurality of inputs of the single pole multi-position wafer section of said first selector switch, (e) diode circuit means coupling the negative portions of said differentiated pulses to the plurality of inputs of said progressively shorting wafer section of said first selector switch.

4. The sequential trigger generator of claim 3 wherein said variable delay circuit means is a variable delay monostable multivibrator.

5. The sequential trigger generator of claim 4 wherein said second circuit means includes:

(a) a first pulse amplifier coupled to the single pole multi-position section of said first selector switch and being responsive to the negative portion of the last pulse passed in the first preselected number of pulses for producing a positive output pulse for triggering said variable delay, (b) a second pulse amplifier coupled to the single pole multi-position section of said first selector switch and being responsive to the positive portion of the last pulse passed in the first preselected number of pulses for producing a negative output pulse for closing said first gate circuit.

6. The sequential trigger generator of claim 2 wherein said gate circuit comprises:

(a) a bistable multivibrator having a first input terminal for receiving gate on pulse and a second input terminal for receiving gate off pulses, (b) a gated amplifier tube having an anode, cathode and control grid, (c) a control tube having an anode, catrode and control grid, (d) said anode of said gated amplifier being coupled to the anode of said control tube, (e) a Zener diode coupling the normally non-conducting portion of said bistable multivibrator to the control grid of said control tube for positively biasing said control tube into saturation when the normally non-conducting portion is in a non-conducting state and removing the positive bias from said control tube and causing it to cease conducting when said normally non-conducting portion is in a conducting state whereby said gated amplifier will amplify signals applied to its control grid.

7. The sequential trigger generator of claim 1 wherein said second pulse generator comprises:

(a) said Schmitt trigger circuit of said first pulse generator, (b) said pulse amplifier of said first pulse generator, (c) a second gate circuit coupled to said pulse amplifier for passing said amplified pulses when said second gate circuit is biased open, (d) a second monostable multivibrator circuit coupled to said second gate circuit and being responsive to pulse signals passed by said second gate circuit to generate a second series of output pulses.

8. The sequential trigger generator of claim 7 wherein said third circuit means comprises:

(a) a second decade counter having an input coupled to the output of said second monostable multivibrator circuit and having a plurality of outputs, (b) a first selector switch having a progressively shorting wafer which has a plurality of inputs corresponding to the plurality of outputs of said second decade counter and a single pole multi-position wafer section which has a plurality of inputs corresponding to the plurality of outputs of said second decade counter, (c) a differentiating network coupled to said plurality of outputs for differentiating the output pulses from said second decade counter, (d) said differentiated pulses being connected directly to the plurality of inputs of the single pole multi-position wafer section of said second selector switch, (e) diode circuit means coupling the negative portions of said differentiated pulses to the plurality of inputs of said progressively shorting wafer section of said second selector switch.

9. The sequential trigger generator of claim 8 wherein said fourth circuit means includes (a) a third pulse amplifier coupled to the single pole multi-position section of said second selector switch and being responsive to the positive portion of the last pulse passed in the second preselected number of pulses for producing a negative output pulse for closing said second gate circuit.

References Cited

UNITED STATES PATENTS

| | | | |
|---|---|---|---|
| 2,926,242 | 2/1960 | Feyzeau | 328—187 X |
| 3,119,071 | 1/1964 | Euler | 328—187 |
| 3,288,920 | 11/1966 | Baracket | 328—187 X |

JOHN S. HEYMAN, *Primary Examiner.*